(12) United States Patent
Saito et al.

(10) Patent No.: US 9,151,628 B1
(45) Date of Patent: Oct. 6, 2015

(54) ASSOCIATING PARKING AREAS WITH DESTINATIONS

(71) Applicant: Nissan North America, Inc., Franklin, TN (US)

(72) Inventors: Daisuke Saito, Sunnyvale, CA (US); Naoki Kojo, Sunnyvale, CA (US); Siddharth Kumar Thakur, Milpitas, CA (US); Nikhil Lele, Sunnyvale, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/609,686

(22) Filed: Jan. 30, 2015

(51) Int. Cl.
  *G01C 21/34* (2006.01)
(52) U.S. Cl.
  CPC ...................... *G01C 21/34* (2013.01)
(58) Field of Classification Search
  CPC ........................................................ G01C 21/34
  USPC ............................................................ 701/23
  See application file for complete search history.

(56) References Cited

U.S. PATENT DOCUMENTS

| 4,656,950 | A | 4/1987 | Rhoton |
| 8,655,588 | B2 | 2/2014 | Wong et al. |
| 8,896,685 | B2 * | 11/2014 | Ihara et al. .................. 348/116 |
| 2006/0184013 | A1 | 8/2006 | Emanuel et al. |
| 2010/0256908 | A1 | 10/2010 | Shimshoni et al. |
| 2013/0060461 | A1 | 3/2013 | Wong et al. |
| 2013/0211705 | A1 * | 8/2013 | Geelen et al. ................ 701/410 |
| 2014/0058634 | A1 | 2/2014 | Wong et al. |
| 2014/0285361 | A1 | 9/2014 | Tippelhofer et al. |
| 2014/0320318 | A1 * | 10/2014 | Victor et al. ............... 340/932.2 |
| 2014/0350853 | A1 | 11/2014 | Proux |
| 2015/0106010 | A1 * | 4/2015 | Martin et al. ................ 701/410 |
| 2015/0141043 | A1 * | 5/2015 | Abramson et al. ......... 455/456.1 |

FOREIGN PATENT DOCUMENTS

| EP | 2568310 A2 | 3/2013 |
| JP | 2013-182551 A | 9/2013 |
| WO | 2013-169182 A1 | 11/2013 |

\* cited by examiner

*Primary Examiner* — Mary Cheung
*Assistant Examiner* — Frederick Brushaber
(74) *Attorney, Agent, or Firm* — Young, Basile, Hanlon & MacFarlane, P.C.

(57) ABSTRACT

A method and apparatus for associating parking areas with destinations may include a vehicle identifying transportation network information including a primary destination and parking area information representing a plurality of parking areas, such that the parking area information includes automatically generated parking area association information describing an association between at least one parking area and the primary destination. The vehicle may determine a target parking area from the plurality of parking areas for the primary destination based on the transportation network information, and identify a route from an origin to the target parking area in the vehicle transportation network using the transportation network information. The vehicle may include a trajectory controller configured to operate the vehicle to travel from the origin to the target parking area using the route.

22 Claims, 7 Drawing Sheets

ASSOCIATING PARKING AREAS WITH DESTINATIONS

TECHNICAL FIELD

This disclosure relates to vehicle routing and navigation.

BACKGROUND

A vehicle may include a control system that may generate and maintain the route of travel and may control the vehicle to traverse the route of travel. An autonomous vehicle may be controlled autonomously, without direct human intervention, to traverse a route of travel from an origin to a destination. Accordingly, a method and apparatus for associating parking areas with destinations may be advantageous.

SUMMARY

Disclosed herein are aspects, features, elements, implementations, and embodiments of associating parking areas with destinations.

An aspect of the disclosed embodiments is a vehicle for associating parking areas with destinations. The vehicle may include a processor configured to execute instructions stored on a non-transitory computer readable medium to identify transportation network information representing a vehicle transportation network, the vehicle transportation network including a primary destination, wherein identifying the transportation network information includes identifying the transportation network information such that the transportation network information includes parking area information representing a plurality of parking areas, wherein each parking area from the plurality of parking areas corresponds with a respective location in the vehicle transportation network, and such that the parking area information includes automatically generated parking area association information describing an association between at least one parking area from the plurality of parking areas and the primary destination. The processor may be configured to execute instructions stored on a non-transitory computer readable medium to determine a target parking area from the plurality of parking areas for the primary destination based on the transportation network information, and identify a route from an origin to the target parking area in the vehicle transportation network using the transportation network information. The vehicle may include a trajectory controller configured to operate the vehicle to travel from the origin to the target parking area using the route.

Another aspect of the disclosed embodiments is a vehicle for associating parking areas with destinations. The vehicle may include a processor configured to execute instructions stored on a non-transitory computer readable medium to identify transportation network information representing a vehicle transportation network, the vehicle transportation network including a primary destination, wherein identifying the transportation network information includes identifying the transportation network information such that the transportation network information includes parking area information representing a plurality of parking areas, wherein each parking area from the plurality of parking areas corresponds with a respective location in the vehicle transportation network, and such that the parking area information includes automatically generated parking area association information describing an association between at least one parking area from the plurality of parking areas and the primary destination, such that the automatically generated parking area association information is based on operating information for a plurality of vehicles and such that the automatically generated parking area association information is determined by filtering the operating information. The processor may be configured to execute instructions stored on a non-transitory computer readable medium to filter the operating information by identifying a vehicle from the plurality of vehicles, identifying a parking operation for the vehicle, identifying a location corresponding to the parking operation as a candidate parking location, wherein the candidate parking location corresponds with the at least one parking area from the plurality of parking areas, identifying a passenger associated with the vehicle, identifying a destination operation for the passenger, identifying a location corresponding to the destination operation as a destination location, wherein a location of the primary destination corresponds with the destination location, and including, in the automatically generated parking area association information, automatically generated parking area association information that describes an association between the primary destination and a parking area corresponding to the candidate parking location. The processor may be configured to execute instructions stored on a non-transitory computer readable medium to determine a target parking area from the plurality of parking areas for the primary destination based on the transportation network information, and identify a route from an origin to the target parking area in the vehicle transportation network using the transportation network information. The vehicle may include a trajectory controller configured to operate the vehicle to travel from the origin to the target parking area using the route.

Another aspect of the disclosed embodiments is a system for generating vehicle transportation network information. The system may include a memory including a non-transitory computer readable medium, and a processor configured to execute instructions stored on the non-transitory computer readable medium to generating vehicle transportation network information. The processor may be configured to execute instructions stored on a non-transitory computer readable medium to identify vehicle transportation network information representing a vehicle transportation network, and automatically generate parking area association information by filtering operating information for a plurality of vehicles. The operating information may include vehicle operating information, wherein the vehicle operating information is information reported by the plurality of vehicles, wherein the vehicle operating information includes a plurality of vehicle operations that includes the parking operation, wherein each vehicle operation from the plurality of vehicle operations is associated with a respective vehicle from the plurality of vehicles, and wherein each parking area from the plurality of parking areas corresponds with a respective vehicle operation from the plurality of vehicle operations, and wherein the vehicle operating information includes passenger information that identifies a plurality of passengers such that each passenger from the plurality of passengers is associated with a respective vehicle from the plurality of vehicles. The operating information may include supplementary vehicle location information, wherein the supplementary vehicle location information is information reported by a plurality of infrastructure devices in response to detecting a respective vehicle from the plurality of vehicles, and wherein each infrastructure device from the plurality of infrastructure devices is associated with a respective location in the vehicle transportation network, and wherein the supplementary vehicle location information includes a plurality of supplementary vehicle parking locations, wherein each supplementary vehicle parking location from the plurality of supplementary vehicle parking locations is associated with a respective vehicle from the plurality of vehicles, and wherein each supplementary vehicle parking location from the plurality of supplementary vehicle parking locations corresponds with a respective parking operation from the plurality of vehicle operations. The operating information may include non-vehicle operating information, wherein the non-vehicle operating information includes a plurality of non-vehicle operations, wherein each non-vehicle operation from the plurality of non-vehicle operations includes location information reported by a portable device associated with a passenger from the plurality of passengers or location information reported to a third party computing system for a user, wherein the non-vehicle operating information includes an association between the user and a passenger from the plurality of passengers. The processor may be configured to execute instructions stored on a non-transitory computer readable medium to filter the operating information by identifying a vehicle from the plurality of vehicles, identifying a parking operation for the vehicle, identifying a location corresponding to the parking operation as a candidate parking location, identifying a passenger associated with the vehicle, identifying a destination operation for the passenger, identifying a location corresponding to the destination operation as a destination, and including, in the automatically generated parking area association information, automatically generated parking area association information that describes an association between a location representing the destination and a parking area corresponding to the candidate parking location. The processor may be configured to execute instructions stored on a non-transitory computer readable medium to update the vehicle transportation network information based on the automatically generated parking area association information.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
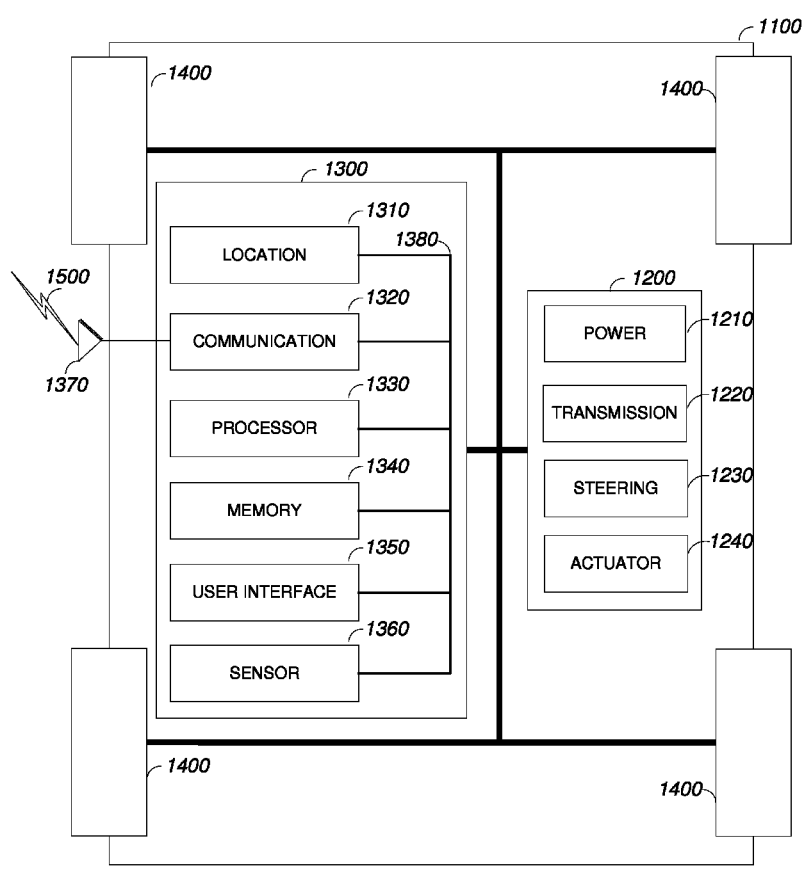
FIG. 1 is a diagram of an example of a portion of an autonomous vehicle in which the aspects, features, and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, the vehicle transportation network information may omit information expressly identifying a parking area for the destination, and parking area information may be automatically generated based on operating information, which may include vehicle operation information, such as information reported by one or more vehicles, supplementary vehicle location information, such as information for the vehicles reported by vehicle infrastructure units, and non-vehicle operating information, such as information reported by a portable device associated with a passenger of the vehicle, or social media information associated with a passenger of the vehicle.

In some embodiments, the operating information may be filtered, or otherwise processed, to correlate parking area information for a vehicle with destination location information for a passenger of the vehicle. The correlated parking area information may be clustered around destinations, and one or more parking areas may associated with a destination in the vehicle transportation network information.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of an autonomous vehicle in which the aspects, features, and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the control unit 1300 the actuator 1240 or both. The steering unit 1230 may be controlled by the control unit 1300 the actuator 1240 or both and may control the wheels 1400 to steer the autonomous vehicle. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, an autonomous vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the autonomous vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the autonomous vehicle 1000.

In some embodiments, the sensors 1360 may include sensors that are operable to obtain information regarding the physical environment surrounding the autonomous vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the autonomous vehicle 1000 may include a trajectory controller. For example, the controller 1300 may include the trajectory controller. The trajectory controller may be operable to obtain information describing a current state of the autonomous vehicle 1000 and a rout planned for the autonomous vehicle 1000, and, based on this information, to determine and optimize a trajectory for the autonomous vehicle 1000. In some embodiments, the trajectory controller may output signals operable to control the autonomous vehicle 1000 such that the autonomous vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the autonomous vehicle 1000 under control of the transmission 1220, or a steered and propelled wheel that may steer and propel the autonomous vehicle 1000.

Although not shown in FIG. 1, an autonomous vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
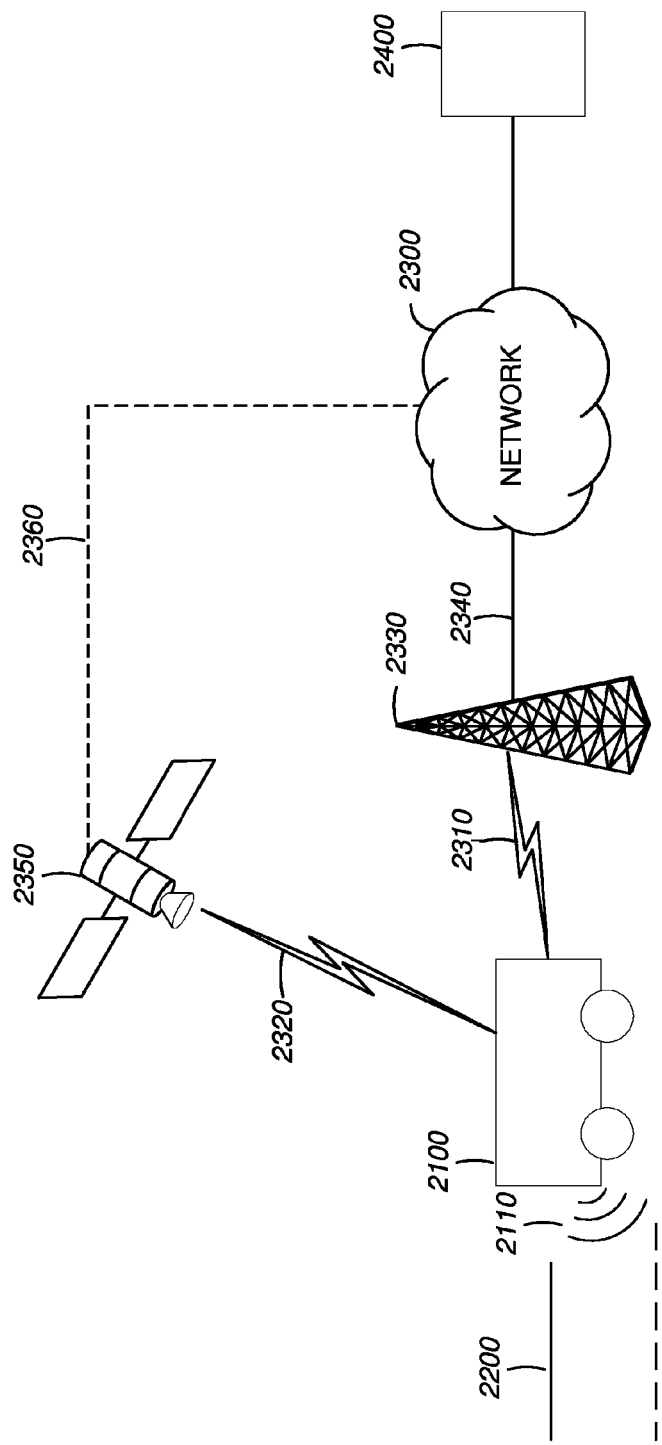
FIG. 2 is a diagram of an example of a portion of an autonomous vehicle transportation and communication system in which the aspects, features, and elements disclosed herein may be implemented.

FIG. 2 is a diagram of an example of a portion of an autonomous vehicle transportation and communication system in which the aspects, features, and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. An access point 2330, which may include a computing device, may be configured to communicate with an autonomous vehicle 2100, with a communication network 2300, with one or more communicating devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the autonomous vehicle 2100 may communicate with the communications network 2300 via a satellite 2350, or other non-terrestrial communication device. A satellite 2350, which may include a computing device, may be configured to communicate with an autonomous vehicle 2100, with a communication network 2300, with one or more communicating devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle may include one or more on-vehicle sensors 2110, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, an autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although, for simplicity, FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units, or elements not shown in FIG. 2. Although the autonomous vehicle 2100 is shown as a single unit, an autonomous vehicle may include any number of interconnected elements.

Figure 3:
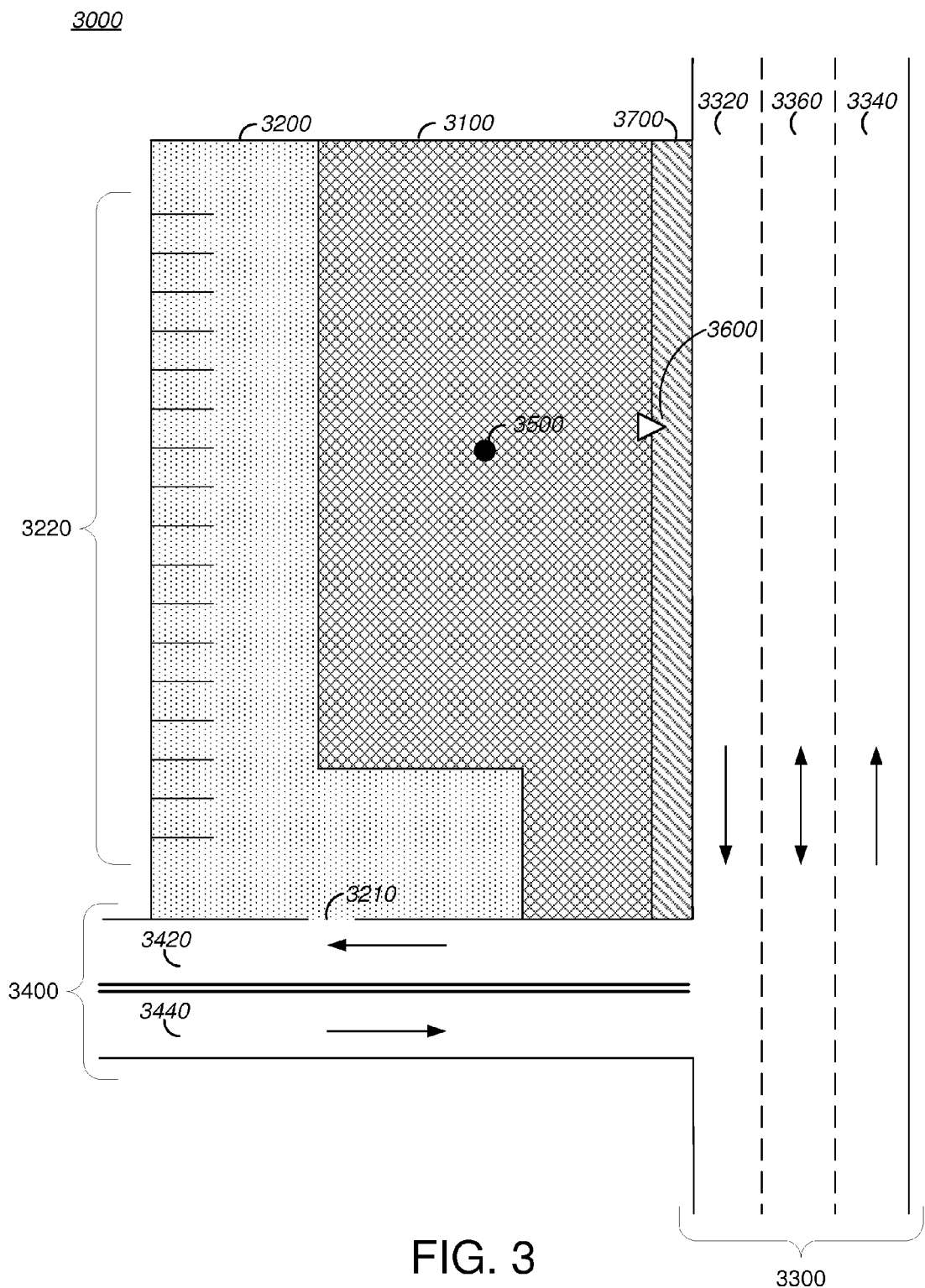
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400 may include one or more lanes 3320/3340/3360/3420/3440, and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the Figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information may identify the building 3100 as a point of interest, an autonomous vehicle may identify the point of interest as a destination, and the autonomous vehicle may travel from an origin to the destination by traversing the vehicle transportation network.

In some embodiments, identifying a destination may include identifying a location for the destination, which may be a discrete uniquely identifiable geolocation, such as the geographic location 3500 for the building 3100. For example, the vehicle transportation network may include a defined location, such as a street address, a postal address, a vehicle transportation network address, a longitude and latitude, or a GPS address, for the destination.

In some embodiments, a destination may be associated with one or more entrances, such as the entrance 3600 shown in FIG. 3. In some embodiments, the vehicle transportation network information may include defined or predicted entrance location information, such as information identifying a geolocation of an entrance associated with a destination.

In some embodiments, the vehicle transportation network may be associated with, or may include, a pedestrian transportation network. For example, FIG. 3 includes a portion 3700 of a pedestrian transportation network, which may be a pedestrian walkway. In some embodiments, a pedestrian transportation network, or a portion thereof, such as the portion 3700 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

In some embodiments, a destination, such as the building 3100 may be associated with a parking area, such as the parking area 3200. For example, the vehicle transportation network information may include defined parking area information indicating that one or more parking areas are associated with a destination. In some embodiments, the vehicle transportation network information may omit information identifying the parking area 3200 or information associating the parking area 3200 with a destination.

In an example, the vehicle transportation network information may include information identifying the parking area 3200 as a navigable or partially navigable portion of the vehicle transportation network, may include information identifying the parking area 3200 as a parking area, and may include defined parking area association information describing an association between a destination, such as the building 3100, and the parking area 3200. Defined parking area association information may be parking area association information generated in response to user input expressly defining or creating the parking area association information.

In another example, the vehicle transportation network information may include information identifying the parking area 3200 as a navigable or partially navigable portion of the vehicle transportation network, may include information identifying the parking area 3200 as a parking area, and may include automatically generated parking area association information describing an association between a destination, such as the building 3100, and the parking area 3200. Automatically generated parking area association information may be parking area association information generated automatically as described herein. In some embodiments, the vehicle transportation network information may omit information identifying an area as a parking area, and automatically generating parking area association information may include automatically generating information identifying an area as a parking area.

Figure 4:
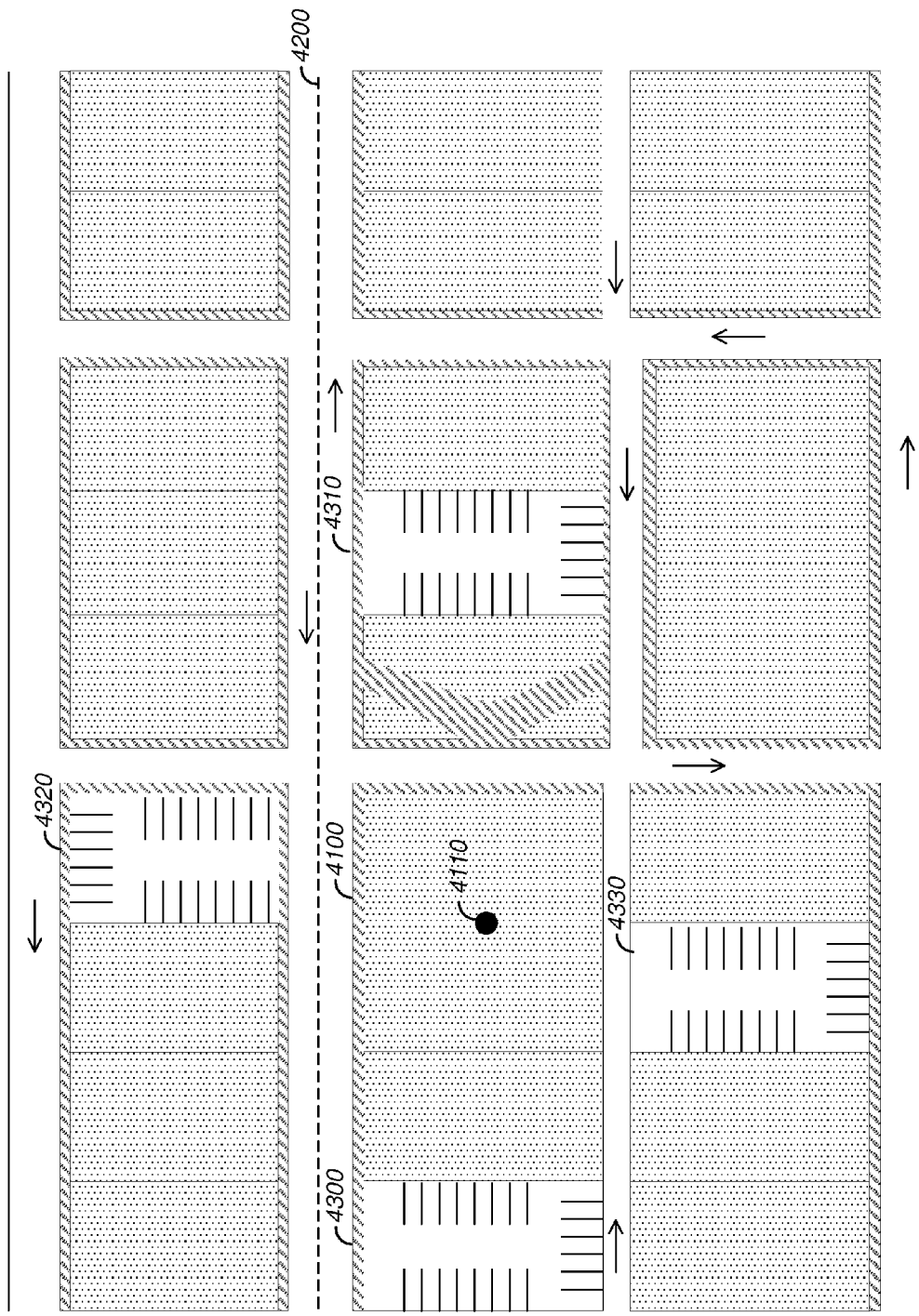
FIG. 4 is a diagram of another portion of a vehicle transportation network in accordance with this disclosure.

FIG. 4 is a diagram of another portion of a vehicle transportation network in accordance with this disclosure. The portion of the vehicle transportation network, as shown in FIG. 4, may include one or more unnavigable areas 4100, such as a building, one or more navigable areas, such as roads 4200, one or more partially navigable areas, such as parking areas 4300/4310/4320/4330, or a combination thereof. In some embodiments, the vehicle transportation network information may include location information for a destination, such as the location 4110 for the building 4100.

In some embodiments, a parking area may be associated with, or dedicated to, a destination. For example, the parking area 3200 shown in FIG. 3 may be dedicated to the building 3100 shown in FIG. 3. In some embodiments, a destination may not be associated with a parking area dedicated to the destination. For example, the parking areas 4300/4310/4320/4330 shown in FIG. 4 may not be dedicated to a particular building, destination, or point of interest.

In some embodiments, an association, or relationship, between a building and a parking area may be described in the vehicle transportation network information as defined parking area association information. In some embodiments, the vehicle transportation network information may omit defined parking area association information, and an association, or relationship, between a building and a parking area may be described in the vehicle transportation network information as automatically generated parking area association information. For example, the vehicle transportation network information representing the portion of the vehicle transportation network shown in FIG. 4 may include automatically generated parking area association information indicating that the parking areas 4300/4310/4320/4330 are parking areas for the building 4100.

Figure 5:
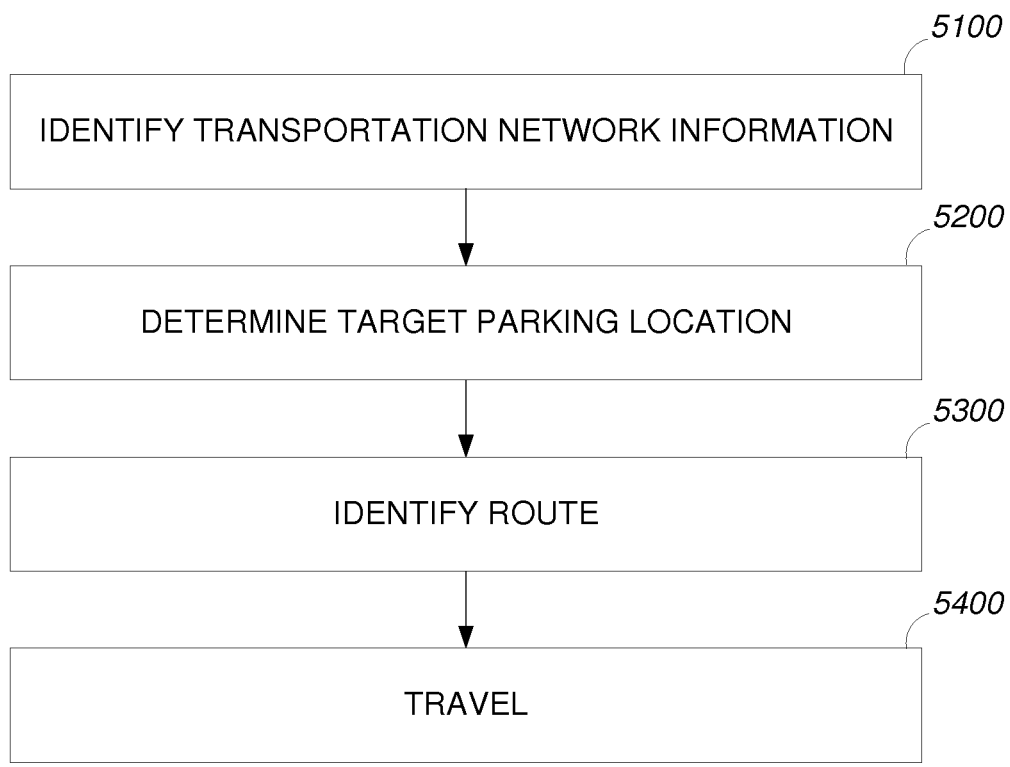
FIG. 5 is a diagram of a method of autonomous vehicle navigation and routing in accordance with this disclosure.

FIG. 5 is a diagram of a method of autonomous vehicle navigation and routing in accordance with this disclosure. Autonomous vehicle navigation and routing may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle navigation and routing. Implementations of autonomous vehicle navigation and routing may include identifying vehicle transportation network information at 5100, determining a target parking area at 5200, identifying a route at 5300, traveling at 5400, or a combination thereof.

In some embodiments, vehicle transportation network information, such as the vehicle transportation network information shown in FIG. 3 or the vehicle transportation network shown in FIG. 4, may be identified at 5100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, identifying the vehicle transportation network information may include transcoding or reformatting the vehicle transportation network information, storing the reformatted vehicle transportation network information, or both.

In some embodiments, the vehicle transportation network information may include parking area information representing one or more parking areas within the vehicle transportation network. In some embodiments, the autonomous vehicle may identify the vehicle transportation network information such that the vehicle transportation network information includes defined parking area association information, automatically generated parking area association information, or a combination thereof.

In some embodiments, a destination may be identified at 5200. Identifying a destination may include identifying a point of interest, such as the building 3100 shown in FIG. 3, or the location 4110 of the building 4100 shown in FIG. 4, as a primary destination, and identifying a target parking area for the point of interest as a secondary destination, or identifying both a primary and a secondary destination.

In some embodiments, the target parking area for to the primary destination within the vehicle transportation network may be identified at 5200 based on the vehicle transportation network information. For example, a building, such as the building 3100 shown in FIG. 3, may be identified as the primary destination, and a parking area, such as the parking area 3200 shown in FIG. 3, may be identified as the target parking area based on defined parking area association information. In some embodiments, the target parking area may be identified based on automatically generated parking area association information. For example, a building, such as the building 4100 shown in FIG. 4, may be identified as the primary destination, and a target parking area, such as one of the parking areas 4300/4310/4320/4330 shown in FIG. 4, may be identified as the target parking area based on automatically generated parking area association information.

A route may be generated at 5300. In some embodiments, generating the route may include identifying an origin. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 5300 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or a combination thereof, near, or proximal to, the current location of the autonomous vehicle. Generating the route may include determining a route from the origin to the target parking area identified at 5200, or generating a route from the origin to a docking location associated with the primary destination, and generating a route from the docking location to the target parking area identified at 5200. For simplicity and clarity, the description herein refers to routing and navigation between an origin and a target parking area; however, routing and navigation may include routing and navigation between the origin and a docking location associated with the primary destination and routing and navigation between the docking location and one or more parking areas.

In some embodiments, generating the route may include generating candidate routes from the origin to the target parking area. In some embodiments, a candidate route may represent a unique or distinct route from the origin to the target parking area. For example, a candidate route may include a unique or distinct combination of roads, road segments, lanes, waypoints, and interchanges.

In some embodiments, generating the route may include identifying routing states. In some embodiments, identifying routing states may include identifying a routing state corresponding to each waypoint in a candidate route, for each of the candidate routes. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, generating the route may include evaluating the expected action costs for performing an action, such as transitioning from one routing state to another, which may correspond with transitioning from one waypoint to another, and may represent the expected cost of the autonomous vehicle traveling from one location, represented by the first waypoint, to another location, represented by the second waypoint, during execution of the route. In some embodiments, an action may indicate a transition from a routing state to an immediately adjacent routing state, which may correspond with transitioning from a waypoint to an immediately adjacent waypoint without intersecting another waypoint, and may represent an autonomous vehicle traveling from a location, represented by the first waypoint, to another location, represented by the immediately adjacent waypoint.

In some embodiments, an action cost may be determined based on the vehicle transportation network information. For example, within a candidate route, a first routing state may correspond with a first waypoint, which may correspond with a first location in the vehicle transportation network, a second routing state may correspond with a second waypoint, which may correspond with second location in the vehicle transportation network, and the action cost may represent an estimated, predicted, or expected cost for the autonomous vehicle to travel from the first location to the second location. In some embodiments, action costs may be context dependent. For example, the action cost for transitioning between two waypoints at one time of day may be significant higher than the action costs for transitioning between the waypoints at another time of day.

In some embodiments, generating the route may include generating probability distributions. In some embodiments, generating the probability distributions may include generating a probable cost distribution for performing an action, such as transitioning from one routing state to another. Generating a probably cost distribution may include determining a probability of successfully performing an action, the probability of failing to perform the action, determining multiple possible costs for performing the action, determining probable costs associating probabilities with possible costs, or a combination thereof.

In some embodiments, generating a probability distribution may include using a normal, or Gaussian, distribution, $N(\mu, \sigma)$, where $\mu$ indicates the mean of the normal distribution, and $\sigma$ indicates the standard deviation. The mean of the normal distribution and the standard deviation may vary from one action to another. In some embodiments, the standard deviation may be augmented based on an action cost uncertainty variance modifier, which may represent variation in the uncertainty of action costs.

In some embodiments, generating a probability distribution may include generating discrete cost probability combinations for an action. For example, for an action in a route, generating a probability distribution may include generating a first probable cost as a combination of a first action cost, such as 45, and a first probability, such as 0.05, and generating a second probable cost as a combination of a second action cost, such as 50, and a second probability, such as 0.08.

In some embodiments, generating a probability distribution may include using a liner model of resources and costs. For example, the probability distribution for the travel time associated with an action may be represented by piece-wise constant functions, and the costs for performing an action may be represented by piece-wise linear functions.

In some embodiments, determining the action cost may include evaluating cost metrics, such as a distance cost metric, a duration cost metric, a fuel cost metric, an acceptability cost metric, or a combination thereof. In some embodiments, the cost metrics may be determined dynamically or may be generated, stored, and accessed from memory, such as in a database. In some embodiments, determining the action cost may include calculating a cost function based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. In some embodiments, an acceptability factor may indicate that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics may include weighting the cost metrics and calculating the action cost based on the weighted cost metrics. Weighting a cost metric may include identifying a weighting factor associated with the cost metric. For example, identifying a weighting factor may include accessing a record indicating the weighting factor and an association between the weighting factor and the cost metric. In some embodiments, weighting a cost metric may include generating a weighted cost metric based on the weighting factor and the cost metric. For example, a weighted cost metric may be a product of the weighting factor and the cost metric. In some embodiments, estimating the action cost may include calculating a sum of cost metrics, or a sum of weighted cost metrics.

In some embodiments, generating the route may include identifying an optimal route. Identifying the optimal route may include selecting a candidate route from the candidate routes based on the probability distributions. For example, a candidate route having a minimal probable route cost may be identified as the optimal route. In some embodiments, identifying the optimal route may include using a constant time stochastic control process, such as a hybrid Markov decision process.

In some embodiments, identifying the optimal route may include selecting the minimum probable action cost from among an action cost probability distribution for transitioning from a first routing state to a second routing state and an action cost probability distribution for transitioning from the first routing state to a third routing state.

In some embodiments, identifying the optimal route may include generating a route cost probability distribution for a candidate route based on the action cost probability distributions for each action in the route. In some embodiments, identifying the optimal route may include generating a route cost probability distribution for each candidate route and selecting the candidate route with the lowest, or minimum, probable route cost as the optimal route.

In some embodiments, the controller may output or store the candidate routes, the optimal route, or both. For example, the controller may store the candidate routes and the optimal route and may output the optimal route to a trajectory controller, vehicle actuator, or a combination thereof, to operate the autonomous vehicle to travel from the origin to the target parking area using the optimal route.

In some embodiments, the autonomous vehicle may travel from the origin to the target parking area using the optimal route at 5400. For example, the autonomous vehicle may include a vehicle actuator, such as the actuator 1240 shown in FIG. 1, and vehicle actuator may operate the autonomous vehicle to begin traveling from the origin to the target parking area using the optimal route. In some embodiments, the autonomous vehicle may include a trajectory controller and the trajectory controller may operate the autonomous vehicle to begin travelling based on the optimal route and current operating characteristics of the autonomous vehicle, and the physical environment surrounding the autonomous vehicle.

In some embodiments, the optimal route may be updated. In some embodiments, updating the optimal route may include updating or regenerating the candidate routes and probability distributions, and identifying the updated optimal route from the updated or regenerated candidate routes and probability distributions.

In some embodiments, the optimal route may be updated based on updated vehicle transportation network information, based on differences between actual travel costs and the probable costs of the selected route, or based on a combination of updated vehicle transportation network information and differences between actual travel costs and the probable costs of the selected route.

In some embodiments, the autonomous vehicle may receive current vehicle transportation network state information before or during travel. In some embodiments, the autonomous vehicle may receive current vehicle transportation network state information, such as off-vehicle sensor information, from an off-vehicle sensor directly, or via a network, such as the electronic communication network 2300 shown in FIG. 2. In some embodiments, the optimal route may be updated in response to receiving current vehicle transportation network state information. For example, the current vehicle transportation network state information may indicate a change of a state, such as a change from open to closed, of a portion of the vehicle transportation network that is included in the optimal route, updating the candidate routes may include removing candidate routes including the closed portion of the vehicle transportation network and generating new candidate routes and probability distributions using the current location of the autonomous vehicle as the origin, and updating the optimal route may include identifying a new optimal route from the new candidate routes.

In some embodiments, the autonomous vehicle may complete traveling to the target parking area from the current location of the autonomous vehicle using the updated optimal route.

In some implementations, identifying the vehicle transportation network information at 5100 may include identifying the vehicle transportation network information such that the vehicle transportation network information includes parking area information representing parking areas in the vehicle transportation network, and parking area association information, such as defined parking area association information and automatically generated parking area association information, describing associations between parking areas and destinations. Examples of automatically generating parking area association information are shown in FIGS. 6-7.

Figure 6:
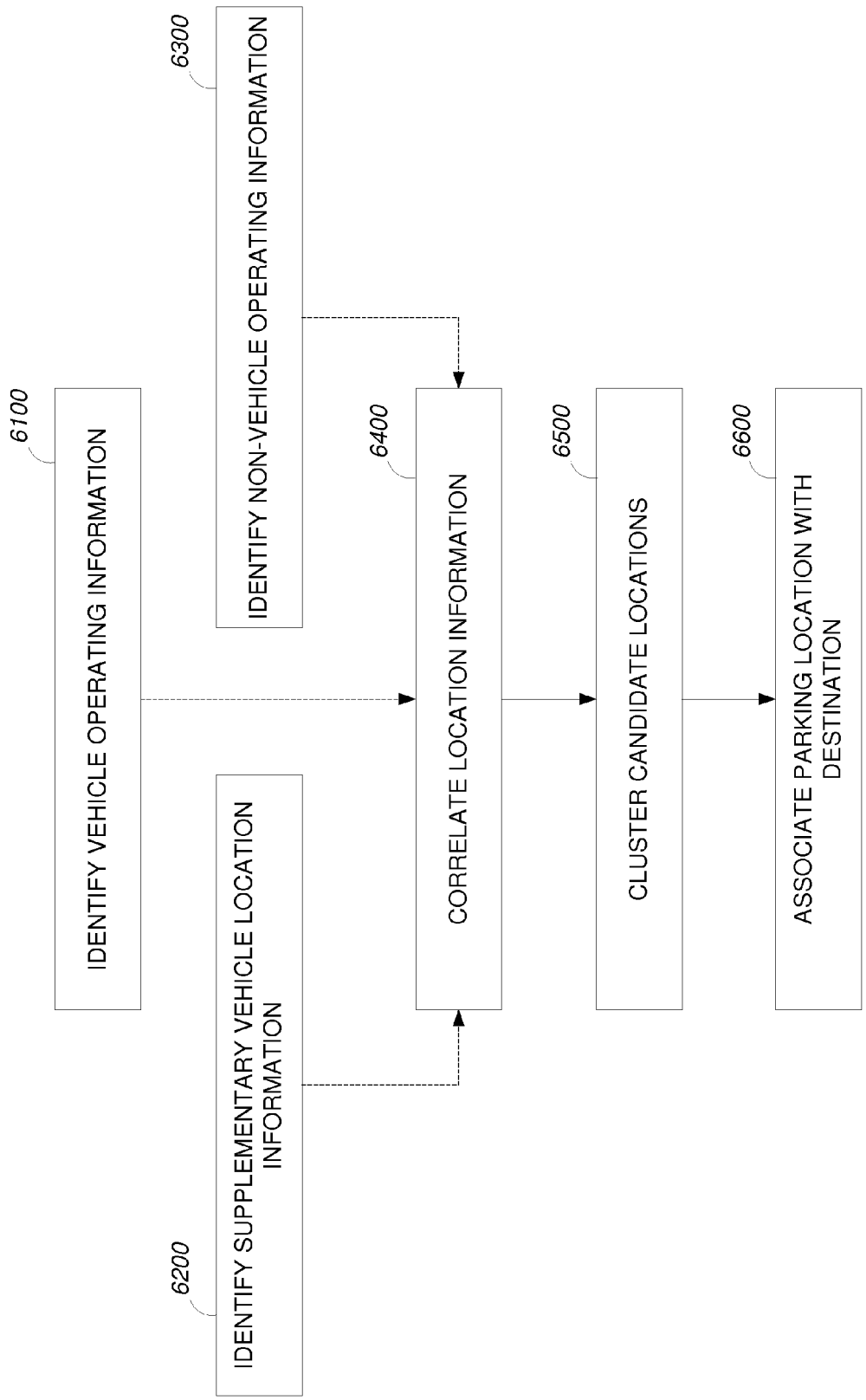
FIG. 6 is a diagram of a method of automatically generating parking area association information in accordance with this disclosure.
Figure 7:
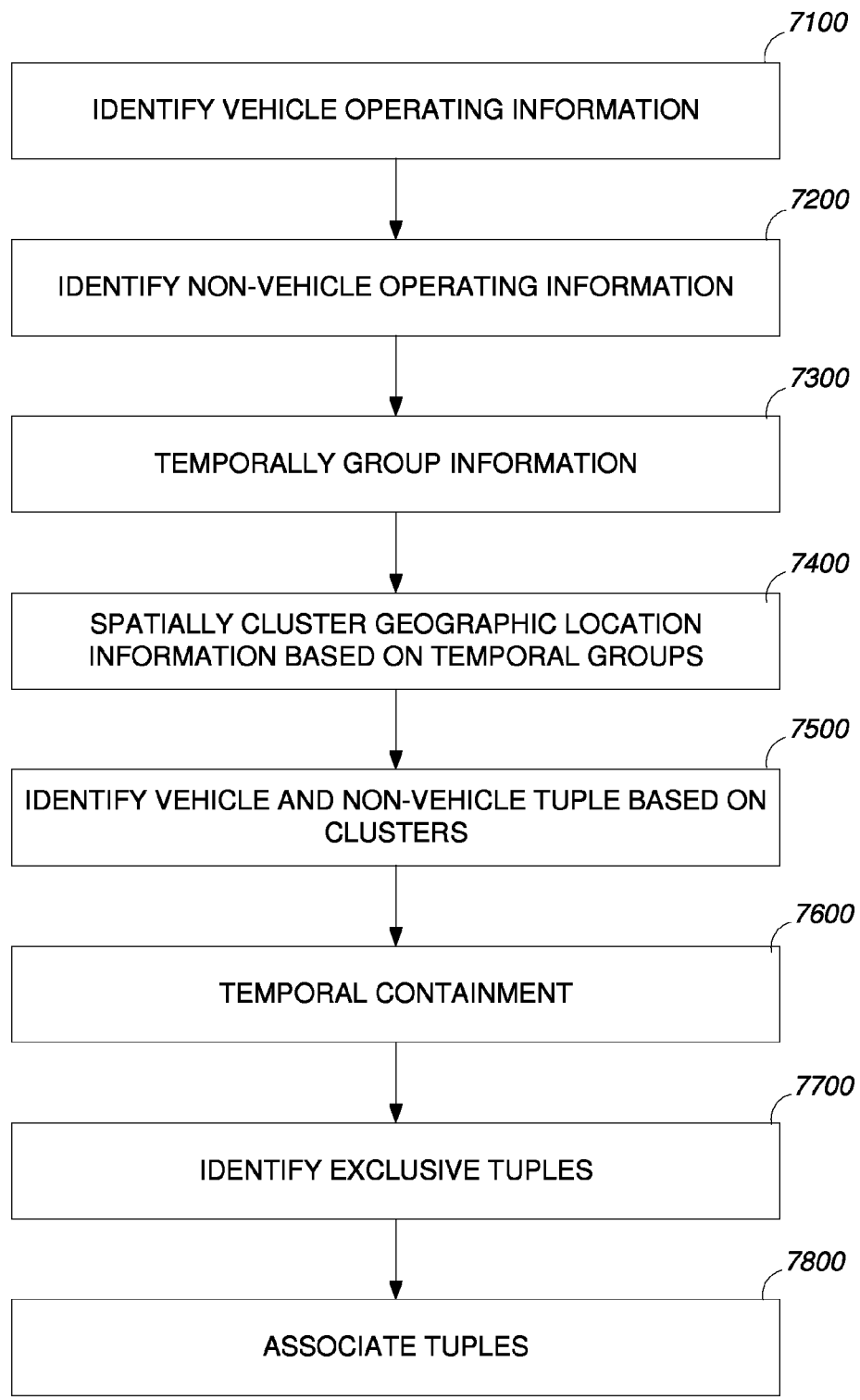
FIG. 7 is a diagram of a method of associating non-vehicle operating information with vehicle operating information in accordance with this disclosure.

FIG. 6 is a diagram of a method of automatically generating parking area association information in accordance with this disclosure. In some embodiments, automatically generating parking area association information may include identifying vehicle operating information at 6100, identifying supplementary vehicle location information at 6200, identifying non-vehicle operating information at 6300, correlating location information at 6400, clustering candidate locations at 6500, associating parking areas with destinations at 6600, or a combination thereof.

Although not shown separately in FIG. 6, automatically generating parking area association information may include identifying operating information, which may include the vehicle operating information, the supplementary vehicle location information, the non-vehicle operating information, or a combination thereof. In some embodiments, identifying vehicle parking area association information may include filtering, or otherwise evaluating, the vehicle operating information, the supplementary vehicle location information, the non-vehicle operating information, or a combination thereof.

In some embodiments, vehicle operating information may be identified at 6100. In some embodiments, the vehicle operating information may include operating information generated for one or more vehicles, which may be manually operated vehicles, and may include vehicle probe data, vehicle location information, vehicle status information, vehicle event information, vehicle bus data, such as controller area network (CAN) data, or any other information generated based on vehicle operation.

In some embodiments, the vehicle operating information may include information reported by a vehicle, or an operational unit thereof, such as a data logging unit, a telemetry unit, a probe unit, an operational recorder, or any other unit or combination of units capable of detecting, storing, or reporting a operation, or an operating condition, of a vehicle, such as a power-up operation, a start operation, a running operating condition, a stop operation, a power-down operation, a door opening operation, a door open operating condition, a door closing operation, a door closed operating condition, a door lock operation, a door locked operating condition, a door unlock operation, a door unlock operating condition, or any other operation or operating condition of the vehicle. In some embodiments, the vehicle operating information may include a time, a date, a geographic location, or a combination thereof, for one or more of the operations, or operating conditions. In some embodiments, the vehicle operating information may be information reported by the plurality of vehicles. For example, the vehicle operating information may include records, each record may be associated with a vehicle identifier, and individual vehicles may be uniquely identified based on the vehicle identifiers.

In some embodiments, the vehicle operating information may include information indicating vehicle operations. A vehicle operation may include event indicators, which may include a type of vehicle operation or an event, such as start, stop, stand, park, door open, door close, load, or unload. A vehicle operation may include a date, a time, or both. A vehicle operation may indicate a location, such as a GPS location within the vehicle transportation network. A vehicle operation may include vehicle state information, such as a current number of passengers or occupancy, a change in occupancy, or a passenger presence state. For example, the vehicle operating information may include information reported by a vehicle, or an operational unit thereof, such as a data logging unit, a telemetry unit, a probe unit, an operational recorder, or any other unit or combination of units capable of detecting, storing, or reporting a operation, or an operating condition, of a vehicle, such as a power-up operation, a start operation, a running operating condition, a stop operation, a power-down operation, a door opening operation, a door open operating condition, a door closing operation, a door closed operating condition, a door lock operation, a door locked operating condition, a door unlock operation, a door unlock operating condition, or any other operation or operating condition of the vehicle. In some embodiments, the vehicle operating information may include a time, a date, a geographic location, or a combination thereof, for one or more of the operations, or operating conditions. For example, the vehicle operating information may indicate a vehicle operation including a stationary period, such as a period or duration between a vehicle stop event and a subsequent vehicle start event, which may be identified as a candidate parking operation, and a corresponding location may be identified as a candidate parking location.

In some embodiments, automatically generating the parking area association information may include evaluating a sequence of events indicated in the vehicle operating information for a vehicle. For example, the vehicle operating information may include event indicators that describe the sequence of events, which may include a stop event and a subsequent start event, and evaluating the sequence of events may include determining the stationary period as a temporal difference between the stop event and the start event.

In some embodiments, the vehicle operating information may include passenger information, such as a passenger identifier. For example, the vehicle operating information for a vehicle operation may include information associating the vehicle operation with a passenger.

In some embodiments, identifying the vehicle operating information may include filtering the vehicle operating information to identify one or more candidate parking locations. For example, the vehicle operating information may include information describing vehicle operations for the plurality of vehicles, wherein each vehicle operation may be associated with a respective vehicle, and identifying the vehicle operating information may include filtering the vehicle operating information to identify candidate parking operations, and corresponding candidate parking locations, based on metrics, such as frequency of the location in the operating information associated with a vehicle, duration of an operation, or a group of operations, time period of an operation, or group of operations, such as daytime, nighttime, morning, or evening. For example, a stationary period associated with a vehicle operation may exceed a minimum parking duration, and the vehicle operation may be identified as a candidate parking operation.

In some embodiments, parking area information may be automatically generated based on vehicle operating information that includes information generated for a defined type of vehicle. For example, the operating information may include a vehicle type indicator, which may indicate whether a vehicle is a personal vehicle or a fleet vehicle, such as a taxi or a parcel delivery vehicle, and the operating information may be filtered to omit operating information based on type, such as to omit fleet type vehicles. In another example, the operating information may include a vehicle operating type indicator, which may indicate whether a vehicle is a low occupancy carrier vehicle, such as a vehicle operating as a taxi or a parcel delivery vehicle, and the operating information may be filtered to omit operating information for vehicles based on operating type, such as to omit information for vehicles operating as low occupancy carrier vehicles.

In some embodiments, supplementary vehicle location information may be identified at 6200. Supplementary vehicle location information may include information reported by infrastructure devices in response to detecting a respective vehicle. For example, an infrastructure device may be a smart parking meter, a parking camera, a parking access device, or any other non-vehicle device associated with a parking area and capable of detecting, or being detected by, a vehicle a defined parking area. The supplementary vehicle location information may include location information identifying a location of the infrastructure device in the vehicle transportation network, such as a defined parking area. For example, a parking meter may identify a vehicle entering the parking area, may record a time, a date, or both, associated with the vehicle entering the parking area, may detect the vehicle exiting the parking area, may record a time, a date, or both of the vehicle exiting the parking area, and may report a supplementary parking operation for the vehicle indicating a defined location of the infrastructure device, the vehicle, the enter time, the exit time, or a combination thereof.

In some embodiments, candidate parking locations may be identified based on a combination of the vehicle operating information and the supplementary vehicle location information. For example, the supplementary vehicle location information may indicate that a vehicle was detected at a defined parking area during a period, the vehicle operating information for the vehicle during the period may indicate that the vehicle idled during the period, and the defined parking area may be filtered or omitted from the candidate parking areas.

In some embodiments, non-vehicle operating information may be identified at 6300. Non-vehicle operating information may include information reported for one or more users of a non-vehicle operating information system or device and may include information indicating non-vehicle operations. The non-vehicle operation information may include a date, a time, or both. A non-vehicle operation may indicate a location, such as a GPS location, a destination, or a point of interest.

In some embodiments, the non-vehicle operating information may include non-vehicle operating information reported by a portable device associated with a vehicle. For example, a portable device, such as a smartphone, carried by a passenger of the vehicle may include information associating the passenger with the vehicle, and may include geographic location information, such as GPS or assisted GPS (AGPS) information.

In some embodiments, the non-vehicle operating information may include information reported by a third party computing system for a user. For example, the non-vehicle operating information may include information from a social network, which may include status information for a user, which may indicate an association between the user and a defined location at a defined time and date. In some embodiments, the non-vehicle operating information may include geo-tagged information, such as a geo-tagged tweet, a geo-tagged picture, or any other geo-tagged non-vehicle operating information.

In some embodiments, the non-vehicle operating information may include information identifying a location, such as a GPS location, that is not associated with a destination or point of interest, and a destination or point of interest corresponding to the indicated location may be identified from the vehicle transportation network information based on proximity.

In some embodiments, the non-vehicle operating information may be filtered, or otherwise processed, to identify destination operations. For example, a destination operation may be identified based on a duration of a period within a defined location, or a frequency of information identifying a location within the defined location. In some embodiments, the non-vehicle operating information may include information expressly indicating a destination location. For example, the non-vehicle operating information may include information indicating an associating between the passenger and a defined location, such as check-in information, or information referencing the location, such as a review, or status information, which may include social network status information.

In some embodiments, filtering the non-vehicle operating information may include identifying a user from the non-vehicle operating information, identifying one or more destination operations for the user, identifying a location corresponding to the destination operation as a candidate destination location, or a combination thereof. In some embodiments, identifying the destination operation for the passenger may include identifying a non-vehicle operation associated with the user from the non-vehicle operating information as the destination operation based on a stationary period associated with the non-vehicle operation. For example, the stationary period, which may indicate the period that the user stayed within a defined location, may exceed a minimum destination duration, and the corresponding operation, or group of operations, may be identified as a destination operation.

In some embodiments, a candidate destination location may be identified based on the vehicle operating information, the non-vehicle operating information, or a combination of vehicle operating information and non-vehicle operating information. For example, the vehicle operating information may indicate a destination, and the indicated destination may be identified as a candidate destination location. In another example, the vehicle operating information may indicate a selected location that includes multiple identifiable destinations, and the non-vehicle operating information may include information identifying one of the identifiable destinations as a destination for a passenger of the vehicle.

In some embodiments, filtering the non-vehicle operating information may include associating a non-vehicle operating information user identifier, such as a social media user name, with a passenger identifier associated with a vehicle. In some embodiments, the non-vehicle operating information user identifier may be associated with the passenger identifier associated with a vehicle based on user input, such as user input identifying the association. For example, a passenger of a vehicle may use a portable electronic device, such as a smartphone, to operate a non-vehicle operating information system, such as an application, to input information associating a user identifier for the device, the non-vehicle operating information system executing on the device, or for a third party non-vehicle operating information system, with the vehicle or with a passenger identifier associated with the passenger and the vehicle. In some embodiments, the non-vehicle operating information user identifier may be associated with the passenger identifier associated with a vehicle automatically as shown in FIG. 7.

In some embodiments, location information may be correlated at 6400. For example, filtering the operating information at 6100/6200/6300 may include identifying candidate parking operations and candidate destination operations. The candidate parking operation information may indicate corresponding temporal information, paring area information, passenger information, or a combination thereof. The candidate destination operation information may indicate corresponding temporal information, destination location information, user information, or a combination thereof. The candidate parking operations may be associated, or correlated, with the candidate destination operations based on temporal similarity and a defined association, or an automatically generated association, between the passenger information from the candidate parking operation and the user information from the candidate destination operation.

In some embodiments, candidate locations may be clustered at 6500. Clustering candidate locations may include generating one or more parking area clusters using, for example, spatial clustering. For example, a parking area cluster may include a spatially, or geographically, proximate group of candidate parking locations. In some embodiments, parking areas may be identified based on the parking area clusters and the vehicle transportation network information. For example, a location, a destination, or a point of interest may be identified in the vehicle transportation network information spatially, or geographically, corresponding to a parking area cluster, and may be identified as a parking area.

Similarly, clustering candidate locations may include generating one or more destination location clusters using, for example, spatial clustering. For example, a destination location cluster may include a spatially, or geographically, proximate group of candidate destination locations. In some embodiments, destinations may be identified based on the destination location clusters and the vehicle transportation network information. For example, a location, a destination, or a point of interest may be identified in the vehicle transportation network information spatially, or geographically, corresponding to a destination location cluster, and may be identified as a destination.

In some embodiments, parking areas may be associated with destinations at 6600. In some embodiments, associating parking areas with destinations may include identifying a parking area, which may correspond with a parking area cluster identified at 6500, identifying a destination, which may correspond with a destination location cluster identified at 6500, associating the parking area with the destination based on the correlation identified at 6400, and including parking area association information in the parking area information describing the association between the parking area and the destination.

FIG. 7 is a diagram of a method of associating non-vehicle operating information with vehicle operating information in accordance with this disclosure. In some embodiments, associating non-vehicle operating information with vehicle operating information may include identifying vehicle operating information at 7100, identifying non-vehicle operating information at 7200, temporally grouping the information at 7300, spatially clustering the information at 7400, identifying tuples at 7500, validating the tuples using temporal containment at 7600, identifying exclusive tuples at 7700, associating tuples at 7800, or a combination thereof.

In some embodiments, vehicle operating information may be identified at 7100, which may be similar to identifying vehicle operating information at 6100 as shown in FIG. 6, and non-vehicle operating information may be identified at 7200, which may be similar to identifying non-vehicle operating information at 6300 as shown in FIG. 6. For simplicity and clarity, the supplementary vehicle location information identified at 6200 as shown in FIG. 6 is omitted from the description of FIG. 7; however, associating non-vehicle operating information with vehicle operating information may include using the supplementary vehicle location information.

In some embodiments, the vehicle operating information and the non-vehicle operating information may be temporally grouped at 7300. In some embodiments, temporally grouping the information may include identifying information groups based on temporal information. Operations, or events, from the vehicle operating information and the non-vehicle operating information may include temporal indicators within a defined period, such as a day, and may be temporally grouped based on the defined period. For example, the operating information group for a defined date may include vehicle operating information for the date and non-vehicle operating information for the date. In some embodiments, the temporal grouping may be based on local time zone information corresponding to the geographic location indicated in the vehicle and non-vehicle operating information. In some embodiments, the temporal information may be normalized, such as to a defined time zone or to Coordinated Universal Time (UTC). For simplicity and clarity, the vehicle operation information and the non-vehicle operating information may be collectively referred to herein as operating information.

In some embodiments, the information in each temporal group identified at 7300 may be spatially, or geographically, clustered at 7400. In some embodiments, the spatial clustering may be Delaunay Triangulation based Spatial Clustering. For example, the operating information in the temporal group for a defined date may include multiple spatial clusters, and each spatial cluster within a temporal group may include vehicle operating information for the date and geographic location and non-vehicle operating information for the date and geographic location.

In some embodiments, pairs, or tuples, of vehicle operations and non-vehicle operations may be identified at 7500. In some embodiments, the tuples may be identified based on passenger identifiers associated with the vehicles in the vehicle operating information and user identifiers associated with non-vehicle operations from the non-vehicle operating information. For example, the operating information for a spatial cluster within a temporal group may include multiple passenger identifiers and multiple user identifiers, and a tuple may be identified for each combination of passenger identifier and user identifier.

In some embodiments, the tuples may be validated using temporal containment at 7600. Validating the tuples using temporal containment may include determining whether temporal information associated with the non-vehicle operating information is within a duration associated with the vehicle operating information, or whether a difference between temporal information associated with the non-vehicle operating information and temporal information associated with the vehicle operating information is within a threshold.

In an example, the vehicle operating information may identify a parking operation associated with a parking duration, a vehicle, a parking area, and a passenger of the vehicle; and the non-vehicle operating information may include a social media message, such as a tweet, associated with a geo-tagged location, a temporal location, such as a time stamp, and a user identifier. The parking duration and the temporal location may each correspond with a defined date, and the parking operation and the social media message may be included in a group for the defined date. The distance between the parking area and the geo-tagged location, for example, may be within a clustering threshold, and the parking operation and the social media message may be included in a spatial cluster within the defined date. The temporal containment may determine that the temporal location is within the parking duration, and a tuple including passenger identifier associated with the parking operation and the user identifier associated with the social media message may be identified as a candidate tuple.

In some embodiments, exclusive tuples may be identified at 7700. Identifying exclusive tuples may include filtering or omitting non-exclusive tuples. For example, referring to example above, the vehicle operating information may include information identifying another parking operation associated with another vehicle associated with another passenger, which may be included in the group for the defined date at 7300, may be included in the cluster at 7400, may be identified as a tuple, with the user identifier, at 7500, may be validated at 7600, and both tuples may be omitted from the exclusive tuples at 7700. In another example, the non-vehicle operating information may include information identifying another social media message associated with another user, which may be included in the group for the defined date at 7300, may be included in the cluster at 7400, may be identified as a tuple, with the passenger identifier, at 7500, may be validated at 7600, and both tuples may be omitted from the exclusive tuples at 7700.

In some embodiments, associations between passenger identifiers and user identifiers may be generated at 7800 based on the exclusive tuples identified at 7700. For example, the passenger identifier and the user identifier for an exclusive tuple may be associated based on a count or cardinality of the number of times the tuple is identified as an exclusive tuple. For example, the number of times that a tuple is identified as an exclusive tuple, which may include multiple dates, multiple locations, or both, may exceed a minimum association threshold and the passenger identifier may be associated with the user identifier.

Although not shown in FIG. 7, the associations between passenger identifiers and user identifiers generated at 7800 may be used to associate parking areas with destinations or points of interest as shown in FIG. 6. For example, correlating location information at 6400 may include correlating the vehicle operating information identified at 6100 in FIG. 6 with the non-vehicle operating information identified at 6300 based on the associations generated as shown in FIG. 7.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A vehicle comprising:
    a processor configured to execute instructions stored on a non-transitory computer readable medium to:
        identify transportation network information representing a vehicle transportation network, the vehicle transportation network including a primary destination, wherein identifying the transportation network information includes identifying the transportation network information such that the transportation network information includes parking area information representing a plurality of parking areas, wherein each parking area from the plurality of parking areas corresponds with a respective location in the vehicle transportation network, and such that the parking area information includes automatically generated parking area association information describing an association between at least one parking area from the plurality of parking areas and the primary destination,
        determine a target parking area from the plurality of parking areas for the primary destination based on the transportation network information, and
        identify a route from an origin to the target parking area in the vehicle transportation network using the transportation network information; and
    a trajectory controller configured to operate the vehicle to travel from the origin to the target parking area using the route.

2. The vehicle of claim 1, wherein the processor is configured to execute instructions stored on the non-transitory computer readable medium to:
    identify a docking location for the primary destination; and
    identify the route such that the route includes a first route portion from the origin to the docking location and a second route portion from the docking location to the target parking area.

3. The vehicle of claim 1, wherein the processor is configured to execute instructions stored on the non-transitory computer readable medium to identify the transportation network information such that the parking area information is based on operating information for a plurality of vehicles, wherein the operating information includes at least one of vehicle operating information, supplementary vehicle location information, or non-vehicle operating information.

4. The vehicle of claim 3, wherein the processor is configured to execute instructions stored on the non-transitory computer readable medium to identify the transportation network information such that the vehicle operating information is information reported by the plurality of vehicles, wherein the vehicle operating information includes a plurality of vehicle operations, wherein each vehicle operation from the plurality of vehicle operations is associated with a respective vehicle from the plurality of vehicles, and wherein each parking area from the plurality of parking areas corresponds with a respective vehicle operation from the plurality of vehicle operations.

5. The vehicle of claim 3, wherein the processor is configured to execute instructions stored on the non-transitory computer readable medium to identify the transportation network information such that the supplementary vehicle location information is information reported by a plurality of infrastructure devices in response to detecting a respective vehicle from the plurality of vehicles, and wherein each infrastructure device from the plurality of infrastructure devices is associated with a respective location in the vehicle transportation network, and wherein the supplementary vehicle location information includes a plurality of supplementary vehicle parking locations, wherein each supplementary vehicle parking location from the plurality of supplementary vehicle parking locations is associated with a respective vehicle from the plurality of vehicles, and wherein each supplementary vehicle parking location from the plurality of supplementary vehicle parking locations corresponds with a respective parking operation from the plurality of vehicle operations.

6. The vehicle of claim 5, wherein the processor is configured to execute instructions stored on the non-transitory computer readable medium to identify the transportation network information such that each infrastructure device from the plurality of infrastructure devices is a smart parking meter, a parking camera, or a parking access device.

7. The vehicle of claim 3, wherein the processor is configured to execute instructions stored on the non-transitory computer readable medium to identify the vehicle transportation network information such that the vehicle operating information includes passenger information that identifies a plurality of passengers such that each passenger from the plurality of passengers is associated with a respective vehicle from the plurality of vehicles.

8. The vehicle of claim 7, wherein the processor is configured to execute instructions stored on the non-transitory computer readable medium to identify the transportation network information such that the non-vehicle operating information includes a plurality of non-vehicle operations, wherein each non-vehicle operation from the plurality of non-vehicle operations includes:
  location information reported by a portable device associated with a passenger from the plurality of passengers; or
  location information reported to a third party computing system for a user, wherein the non-vehicle operating information includes an association between the user and a passenger from the plurality of passengers.

9. The vehicle of claim 3, wherein the processor is configured to execute instructions stored on the non-transitory computer readable medium to identify the transportation network information such that the parking area information is determined by filtering the operating information.

10. The vehicle of claim 9, wherein filtering the operating information includes:
  identifying a vehicle from the plurality of vehicles;
  identifying a parking operation for the vehicle; and
  identifying a location corresponding to the parking operation as a candidate parking location.

11. The vehicle of claim 10, wherein identifying the parking operation includes:
  on a condition that the operating information includes vehicle operating information, identifying the parking operation based on the vehicle operating information;
  on a condition that the operating information includes supplementary vehicle location information, identifying the parking operation based on the supplementary vehicle location information; and
  on a condition that the operating information includes vehicle operating information and includes supplementary vehicle location information, identifying the parking operation based on at least one of the vehicle operating information or the supplementary vehicle location information.

12. The vehicle of claim 11, wherein identifying the parking operation based on the vehicle operating information includes:
  identifying an operation associated with the vehicle from the vehicle operating information as the parking operation on a condition that a stationary period associated with the operation exceeds a minimum parking duration.

13. The vehicle of claim 10, wherein filtering the operating information includes:
  identifying a passenger associated with the vehicle;
  identifying a destination operation for the passenger; and
  identifying a location corresponding to the destination operation as a destination location.

14. The vehicle of claim 13, wherein identifying the destination operation for the passenger includes:
  identifying a non-vehicle operation associated with the passenger from the non-vehicle operating information as the destination operation on a condition that a stationary period associated with the non-vehicle operation exceeds a minimum destination duration.

15. The vehicle of claim 13, wherein the processor is configured to execute instructions stored on the non-transitory computer readable medium to identify the transportation network information such that the parking area information is determined by:
  identifying a plurality of parking area clusters based on the vehicle operating information, wherein the each parking area cluster from the plurality of parking area clusters includes at least one candidate parking location; and
  identifying a plurality of destination location clusters based on the non-vehicle operating information, wherein the each destination location cluster from the plurality of destination location clusters includes at least one destination location.

16. The vehicle of claim 13, wherein the processor is configured to execute instructions stored on the non-transitory computer readable medium to identify the transportation network information such that the parking area information is determined by:
  identifying the plurality of parking areas such that at least one parking area from the plurality of parking areas corresponds with a parking area cluster from the plurality of parking area clusters;
  identifying a plurality of destinations, such that the plurality of destinations includes the primary destination, and such that at least one destinations from the plurality of destinations corresponds with a destination location cluster from the plurality of destination location clusters; and
  including, in the parking area information, the automatically generated parking area association information, such that the automatically generated parking area association information describes at least one association between a destination from the plurality of destinations and a parking area from the plurality of parking areas.

17. The vehicle of claim 16, wherein the processor is configured to execute instructions stored on the non-transitory computer readable medium to identify the transportation network information such that the parking area association information describes an automatically generated association between the primary destination and a parking area from the plurality of parking areas.

18. The vehicle of claim 1, wherein the vehicle is an autonomous vehicle.

19. A vehicle comprising:
  a processor configured to execute instructions stored on a non-transitory computer readable medium to:
    identify transportation network information representing a vehicle transportation network, the vehicle transportation network including a primary destination, wherein identifying the transportation network information includes identifying the transportation network information such that the transportation network information includes parking area information representing a plurality of parking areas, wherein each parking area from the plurality of parking areas corresponds with a respective location in the vehicle transportation network, and such that the parking area information includes automatically generated parking area association information describing an association between at least one parking area from the plurality of parking areas and the primary destination, such that the automatically generated parking area association information is based on operating information for a plurality of vehicles and such that the automatically generated parking area association information is determined by filtering the operating information, wherein filtering the operating information includes:

identifying a vehicle from the plurality of vehicles,
identifying a parking operation for the vehicle,
identifying a location corresponding to the parking operation as a candidate parking location, wherein the candidate parking location corresponds with the at least one parking area from the plurality of parking areas,
identifying a passenger associated with the vehicle,
identifying a destination operation for the passenger,
identifying a location corresponding to the destination operation as a destination location, wherein a location of the primary destination corresponds with the destination location, and
including, in the automatically generated parking area association information, automatically generated parking area association information that describes an association between the primary destination and a parking area corresponding to the candidate parking location;

determine a target parking area from the plurality of parking areas for the primary destination based on the transportation network information, and identify a route from an origin to the target parking area in the vehicle transportation network using the transportation network information; and a trajectory controller configured to operate the vehicle to travel from the origin to the target parking area using the route.

20. The vehicle of claim 19, wherein the processor is configured to execute instructions stored on the non-transitory computer readable medium to:

identify a docking location for the primary destination; and
identify the route such that the route includes a first route portion from the origin to the docking location and a second route portion from the docking location to the target parking area.

21. The vehicle of claim 19, wherein the processor is configured to execute instructions stored on the non-transitory computer readable medium to identify the transportation network information such that the operating information includes at least one of:

vehicle operating information, wherein the vehicle operating information is information reported by the plurality of vehicles, wherein the vehicle operating information includes a plurality of vehicle operations that includes the parking operation, wherein each vehicle operation from the plurality of vehicle operations is associated with a respective vehicle from the plurality of vehicles, and wherein each parking area from the plurality of parking areas corresponds with a respective vehicle operation from the plurality of vehicle operations, and wherein the vehicle operating information includes passenger information that identifies a plurality of passengers such that each passenger from the plurality of passengers is associated with a respective vehicle from the plurality of vehicles;

supplementary vehicle location information, wherein the supplementary vehicle location information is information reported by a plurality of infrastructure devices in response to detecting a respective vehicle from the plurality of vehicles, and wherein each infrastructure device from the plurality of infrastructure devices is associated with a respective location in the vehicle transportation network, and wherein the supplementary vehicle location information includes a plurality of supplementary vehicle parking locations, wherein each supplementary vehicle parking location from the plurality of supplementary vehicle parking locations is associated with a respective vehicle from the plurality of vehicles, and wherein each supplementary vehicle parking location from the plurality of supplementary vehicle parking locations corresponds with a respective parking operation from the plurality of vehicle operations, or non-vehicle operating information, wherein the non-vehicle operating information includes a plurality of non-vehicle operations, wherein each non-vehicle operation from the plurality of non-vehicle operations includes location information reported by a portable device associated with a passenger from the plurality of passengers or location information reported to a third party computing system for a user, wherein the non-vehicle operating information includes an association between the user and a passenger from the plurality of passengers.

22. The vehicle of claim 19, wherein the vehicle is an autonomous vehicle.

* * * * *